Patented May 27, 1952

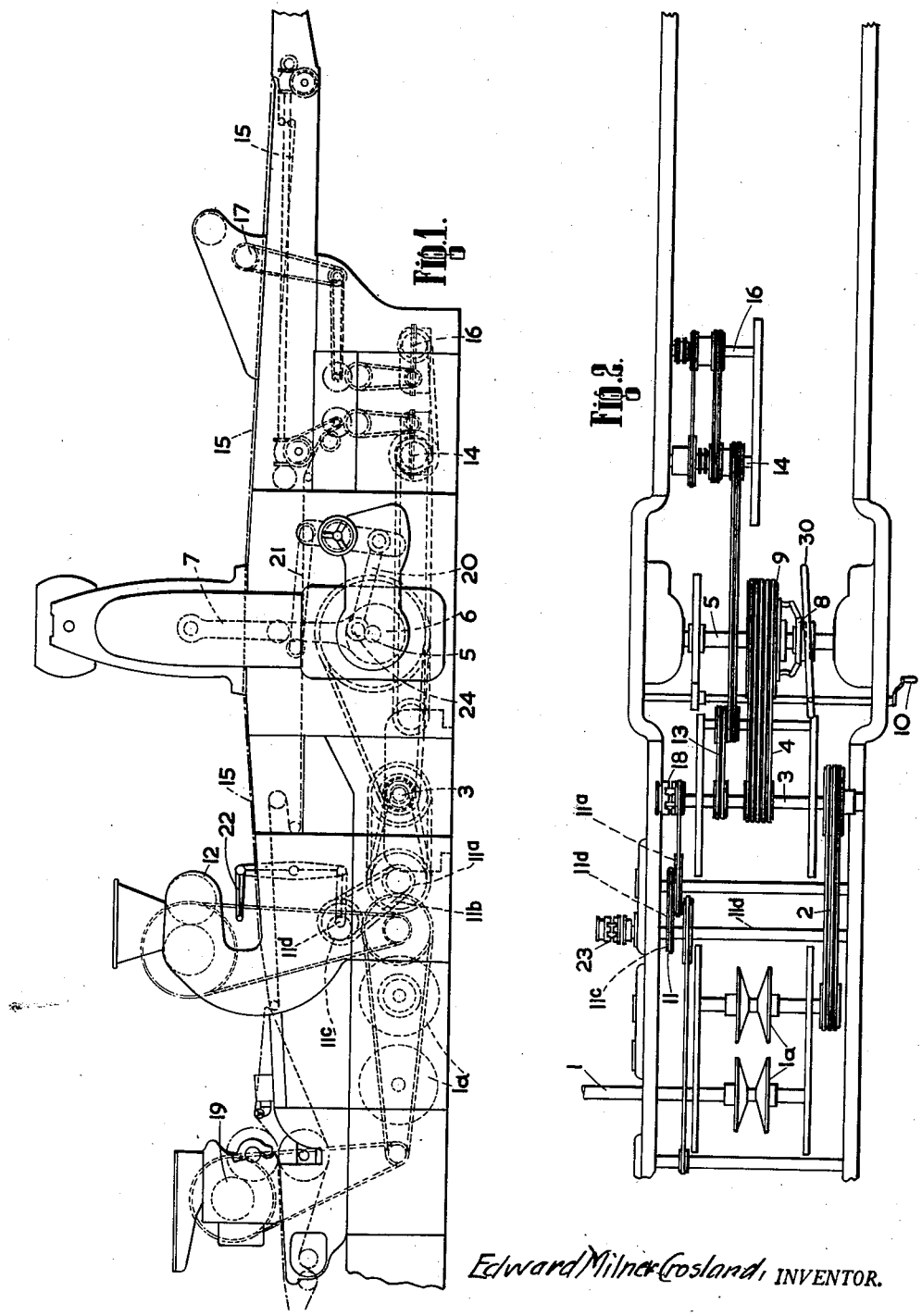

2,598,510

UNITED STATES PATENT OFFICE 2,598,510

BISCUITMAKING AND THE LIKE MACHINERY

Edward Milner Crosland, Culcheth, near Warrington, England, assignor to T. & T. Vicars Limited, Earlestown, Newton-le-Willows, England, a British company Application February 13, 1948, Serial No. 8,222
In Great Britain July 31, 1939

Section 1, Public Law 690, August 8, 1946
Patent expires July 31, 1959

1 Claim. (Cl. 107—4)

The invention relates to biscuit making machinery and particularly the apparatus known as a cutting machine used for stamping and cutting biscuits from a dough sheet. Biscuits are made in several ways the biscuits made in each way having their individual characteristics.

One way is by carrying a sheet of dough over a table and under a set of cutters, which cutters are attached to a reciprocating crosshead, work up and down and stamp and cut out the dough pieces.

A second way is by compressing the dough and extruding it through dies using a wire to cut off slices of the extruded dough each slice forming a biscuit. This is known as wire cutting.

An alternative method is by having a roller engraved with the biscuit impressions, the impressions being filled with dough under pressure and after the surplus is scraped away the impression is emptied by the roller coming into intimate contact with the web, the adhesion of the web and the dough bringing the formed biscuit out of the impression. This is known as rotary moulding.

Where biscuits have been baked on pans, the machine automatically filling one pan at a time, the pans being removed by hand on to the oven, it has been customary to have individual machines for each purpose, but wherever baking is done on a continuously moving band fed automatically from the machine, it is desirable to combine in one machine the facilities for making the different types of biscuits.

In one arrangement where these various biscuit forming devices have been combined into a single machine the various units are driven from a main common driving shaft, but as this machine deposited the biscuits as formed, on pans, it was necessary to dismantle certain parts such as the cutting machine web, when making for instance drop or wire cut biscuits, and to reassemble the cutting web when making stamped or cut biscuits; further a clutch was arranged to interrupt the drive to the cutting machine when drop or wire cut biscuits were to be made.

It has also been usual to combine rotary dough moulding biscuit forming devices with step by step cutting devices into a single machine, means being provided to disconnect the drive from a main driving shaft to the various biscuit forming devices when these are not required to operate.

In the machine of the present invention a rotary dough biscuit moulding device, a wire cut biscuit forming device or the like, and a reciprocating biscuit cutting or embossing device are driven from a common driving shaft and operated in combination with a common continuously moving conveyor which simultaneously acts as the cutting web, clutch means being provided to interrupt the drive to the cutting or embossing device when the rotary dough biscuit moulding device or other alternative biscuit forming device is in operation, whereby unnecessary load on the machine is avoided by not running the main cutter crosshead. This further renders possible the movement of the cutter crosshead by hand when the rest of the machine is stopped. A hand movement is used when cutters are being removed or fixed to the cutter crosshead. A hand movement is also used to try the amount of impression that is being given to the cutters before the crosshead is moved by power.

The invention is more particularly described with reference to the accompanying drawing in which:

Figure 1 is a side elevation of one form of construction, the hand crank and shaft whereon it is supported being omitted, Figure 2 is a corresponding detail plan view, certain parts such as the eccentrics for driving the cutting mechanism and their connection to the cutting mechanism, the driving connections to the extruder and moulder and the driving connection to the conveyor, being omitted.

The drive is taken from a prime mover such as an electric motor (not shown) to a main driving shaft 1 which through a variable belt pulley drive 1a and multiple drive 2 drives countershaft 3, which in turn drives by multiple belt or the like gearing 4 a main shaft 5 on which are arranged eccentrics 6 for the operation of cutters or embossing tools, or both, by means of links 7. The cutters and embossing tools may be, for instance, of the type shown in United States Patent No. 2,525,711 (J. F. Naylor), granted October 10, 1950.

The shaft 3 also drives countershaft 14 forming a drive for the cutting conveyor 15, and a drive can be taken as shown at 16, 17, to a scrap return conveyor. This conveyor 15 supporting the dough web co-operates with the cutters moving down into the dough and also forward with it, in that its upper surface lies in the plane of the lowermost range of movement of the cutter ends of said cutting device.

A clutch 8 is disposed between the multiple belt pulley 9 of the drive 4 and the main shaft 5 and this clutch can be put in or out of operation by means of a hand crank 10 so the pulley is connected to turn shaft 5 or disconnected to rotate freely relative to the shaft 5. The shaft of the hand crank 10 is threaded and has a nut upon it pivoted to a lever 30 engaging the collar of the clutch withdrawal mechanism for the clutch 8, which can be of the expanding ring type. A crank pin 24 on the eccentric 6 oscillates the cutters to and fro through links 20, 21 so that when these cutters are moving forward, their speed of displacement will be the same speed as the speed of the continuously moving conveyor band 15 that is to say during the time when biscuits are being cut on the conveyor band by the said cutters. The countershaft 3 has an individual drive 11 for an actuator of suitable construction (Fig. 1) connected to the wire cutter operating arm 22 of extrusion machine 12 which can be put in and out of action by means of dog clutch 18. When the teeth of clutch 18 are engaged, shaft 3 is connected to pulley 11a of drive 11, so this pulley 11a drives through belt 11b to turn pulley 11c on drive shaft 11d for the wire cutter 22 of the extrusion machine 12. When the teeth of the clutch 18 are disengaged, pulley 11a is permitted to remain free on the rotating drive shaft 3 so the wire cutter 22 is disconnected from the drive shaft 3. It will consequently be seen that by the operation of crank handle 10 clutch 8 can be thrown out of engagement so that shaft 5 will not revolve and therefore the cutting mechanism will not operate. If then dough is fed to the dough moulding machine 12, and the teeth of dog clutch 18 are put into engagement, the wire cutter will operate and the biscuits falling on the web 15 will be carried through to the oven on this conveyor web 15. Similarly, if rotary moulding attachment 19 is used, then clutch 18 remains engaged and dog clutch 23 is engaged and clutch 8 will be disengaged, and biscuits delivered from the rotary moulding machine 19 can be delivered directly to the oven by conveyor 15. The dough moulding machine 12 takes little power when no dough is passing through it, so that it can remain running even while biscuits are being made on the machine 19.

This has the advantage that a machine can be rapidly converted from use for the manufacture of cut biscuits to the manufacture of extruded biscuits, and it has the further advantage that by isolating the drive to the cutting mechanism, this can be adjusted by a hand crank or inching motor for the purpose of testing this or adjusting any phase of its operation.

I declare that what I claim is:

A biscuit making machine including in combination a conveyor, a reciprocating biscuit cutting device mounted over the conveyor and spaced from the input end of the conveyor, a drive shaft for said biscuit cutting device disposed below said conveyor and below said device, a secondary drive shaft for another biscuit forming device disposed below said conveyor, means to drive said secondary drive shaft, clutch means interposed between said drive means and the drive shaft for the biscuit cutting device to connect and disconnect said means and the drive shaft for the biscuit cutting device, and clutch means interposed between said drive means and the drive shaft for the other biscuit forming device to connect and disconnect said drive means and the drive shaft for the other biscuit forming device.

EDWARD MILNER CROSLAND.

REFERENCES CITED

The following references are of record in the file of this patent:

UNITED STATES PATENTS

| Number | Name | Date |
| --- | --- | --- |
| 533,555 | Perky | Feb. 5, 1895 |
| 870,249 | Patterson | Nov. 5, 1907 |
| 1,900,452 | Ledeen | Mar. 7, 1933 |
| 1,965,779 | Mercier | July 10, 1934 |
| 1,990,810 | Young | Feb. 12, 1935 |